United States Patent [19]
Klems

[11] Patent Number: 5,254,197
[45] Date of Patent: Oct. 19, 1993

[54] MICROWAVE BONDING OF FOAM TO FABRIC USING WATER AS A SUSCEPTOR

[75] Inventor: William F. Klems, Royal Oak, Mich.

[73] Assignee: Lear Seating Corp., Southfield, Mich.

[21] Appl. No.: 542,958

[22] Filed: Jun. 25, 1990

[51] Int. Cl.$^5$ ............................................. B32B 31/00
[52] U.S. Cl. ........................ 156/272.2; 156/273.7; 156/275.7; 156/285; 156/381; 219/10.55 M
[58] Field of Search ............... 156/272.2, 275.7, 245, 156/285, 310, 381, 273.7; 219/10.55 R, 10.55 M

[56] References Cited

U.S. PATENT DOCUMENTS

| | | | |
|---|---|---|---|
| 2,992,958 | 7/1961 | Yamaguchi | 156/274.4 |
| 3,216,849 | 11/1965 | Jacobs | 156/272.2 X |
| 3,528,867 | 9/1970 | Leatherman et al. | 156/272.2 X |
| 3,652,359 | 3/1972 | Decker | 156/285 X |
| 3,654,019 | 4/1972 | Cusick | 156/285 |
| 3,657,038 | 4/1972 | Lightfoot | |
| 3,759,776 | 9/1973 | Decker | 156/310 X |
| 4,083,901 | 4/1978 | Schonfeld et al. | 264/25 |
| 4,090,897 | 5/1978 | Minick | 156/73.1 |
| 4,104,098 | 8/1978 | Hush et al. | 156/149 |
| 4,352,858 | 10/1982 | Stanley | 156/331.4 X |
| 4,541,885 | 9/1985 | Caudill, Jr. | 156/274.4 X |
| 4,579,617 | 4/1986 | Oberg et al. | 156/184 |
| 4,626,642 | 12/1986 | Wang et al. | 156/275.3 X |
| 4,686,136 | 8/1987 | Homonoff et al. | 156/73.1 |
| 4,692,199 | 9/1987 | Kozlowski et al. | 156/245 |
| 4,692,199 | 10/1987 | Kozlowski et al. | 156/245 |
| 4,728,566 | 3/1988 | Lancaster et al. | 156/272.2 X |
| 4,737,226 | 4/1988 | Inoue | 156/245 |
| 4,970,358 | 11/1990 | Brandberg et al. | 426/243 X |
| 5,000,805 | 3/1991 | Lowe | 156/285 X |

OTHER PUBLICATIONS

Zygmont, J., "Industry Warms Up To Microwave Ovens" *High Technology*, Mar., 1987, pp. 62-63.

*Primary Examiner*—David A. Simmons
*Assistant Examiner*—Chester T. Barry
*Attorney, Agent, or Firm*—Reising, Ethington, Barnard, Perry & Milton

[57] ABSTRACT

An apparatus (10, 10', 10") for adhesively bonding a fabric layer (16) to a cellular foam pad (18) using a heat-sensitive adhesive (14) to produce a seat cushion assembly (12). The apparatus (10, 10', 10") includes a microwave radiation source (22, 22', 22") for emitting microwaves to selectively heat the adhesive (14) above its melting temperature to adhesively bond the fabric layer (16) to the foam pad (18). A method is also provided for fabricating a cushion assembly (12) in accordance with the subject invention.

8 Claims, 4 Drawing Sheets

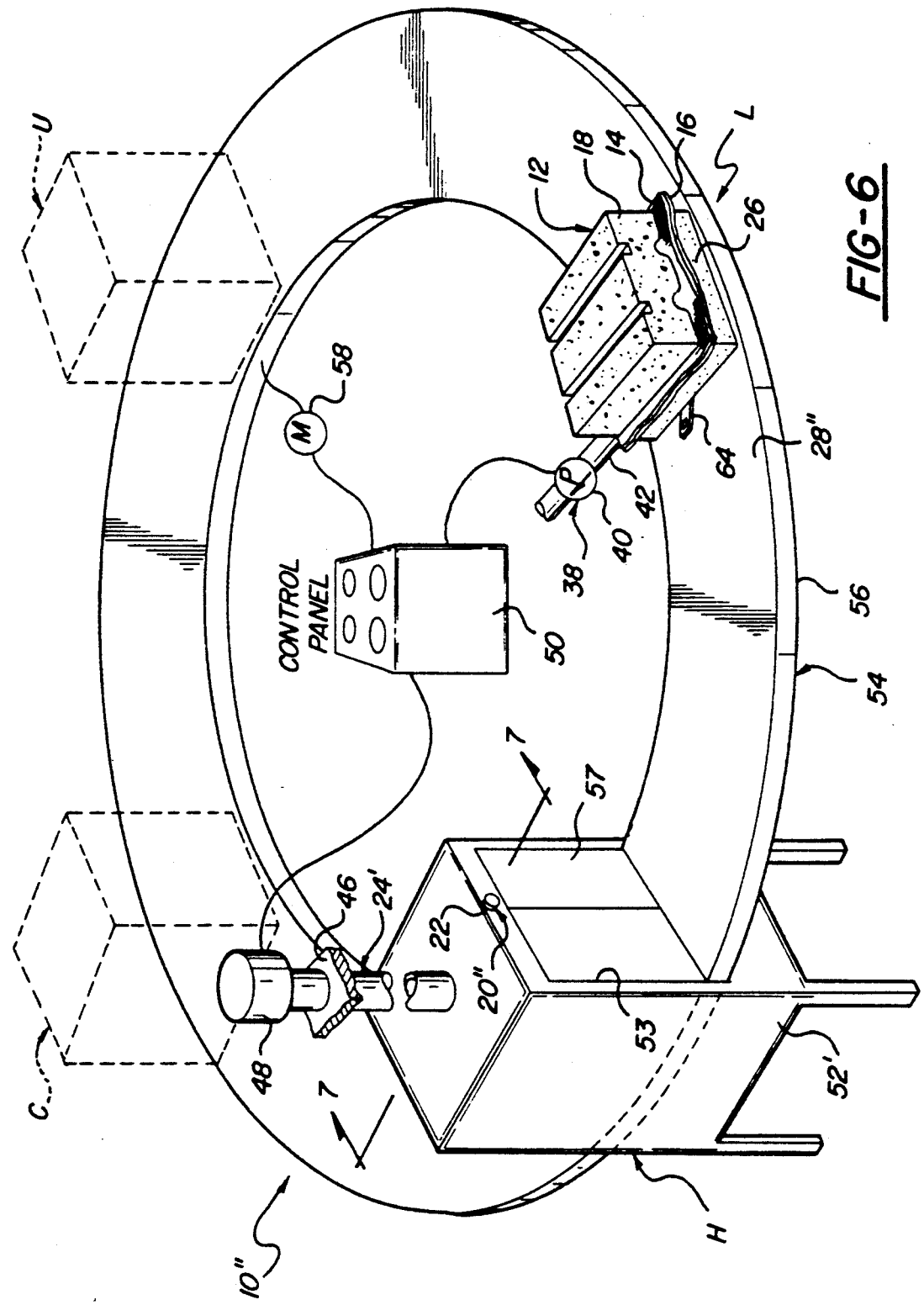

MICROWAVE BONDING OF FOAM TO FABRIC USING WATER AS A SUSCEPTOR

TECHNICAL FIELD

The subject invention relates to a method and apparatus for securing a fabric cover to a cellular foam pad of the type utilized for seating and back cushions in automotive vehicles.

BACKGROUND ART

A great deal of developmental activity has been expended to eliminate the costly, labor intensive cut and sew method of wrapping fabric about a cellular foam pad in automotive seat fabrications. One such development employs contact adhesives applied to the fabric layer and the foam pad to adhesively bond them together. However, once the adhesive is applied, it is difficult to properly position the fabric onto the foam pad resulting in misalignment and/or wrinkles in the bonded fabric.

Other developments include placing a heat-sensitive adhesive fabric or film between the fabric and the foam pad and subsequently melting the adhesive to effectuate bonding. One known technique for melting the adhesive employs a heated pressing mold in contact with the fabric layer to conduct heat through the fabric layer which, in turn, melts the adhesive. In addition to being time consuming, this technique causes nonuniform bonding due to an uneven temperature distribution throughout the adhesive. Additionally, many fabric types which are otherwise well suited for seating applications are made from materials which cannot withstand the high temperature ranges encountered with this technique, thus rendering unusable these otherwise desirable materials.

Another technique for heating and melting the adhesive film uses heated steam injected through either the fabric layer or the foam pad to melt the adhesive. Such a technique is disclosed in U.S. Pat. No. 4,692,199 to Kozlowski et al, assigned to the assignee of the present invention. The mold surfaces may also be heated in addition to the injection of steam to assist in the melting of the adhesive as is disclosed in U.S. Pat. No. 4,737,226 to Inoue. As discussed above, certain seat cover fabrics are sensitive to high temperature environments and thus may be damaged by the injection of heated steam. Another disadvantage of the steam injection method is that an amount of steam in excess of that necessary to melt the adhesive is required due to condensation and temperature loss as the steam passes through the fabric layer or the foam cushion prior to reaching the adhesive. Consequently, once the bonding process is completed, the excess steam must be extracted from the cushion assembly to prevent moisture damage to the assembly.

Industrial applications of microwave radiation heating have thus far been limited to the heating of rubber as disclosed in U.S. Pat. No. 4,104,098 to Hush et al, and for preheating plastics prior to a forming operation as disclosed in U.S. Pat. No. 4,579,617 to Oberg et al and in an article appearing in the March 1987 issue of *High Technology*, entitled "Industry Warms Up to Microwave Ovens," by Zygmont.

SUMMARY OF THE INVENTION AND ADVANTAGES

The present invention provides an apparatus for adhesively bonding a fabric layer to a cellular foam pad using heat-sensitive adhesive means in the fabrication of a cushion assembly. The apparatus includes a cushion assembly comprising a heat-sensitive adhesive means disposed between a fabric layer and a foam pad to be bonded. The apparatus is characterized by including electromagnetic radiation heating means for transmitting transverse electromagnetic radiation waves which are reactive with the adhesive means to selectively heat and melt the adhesive means thereby bonding the fabric layer to the foam pad.

The present invention further provides a method of making a fabric covered cushion assembly. The method includes the steps of; positioning a heat-sensitive adhesive between a fabric layer and a foam pad comprising a cushion assembly, and radiating the adhesive with transverse electromagnetic radiation waves for heating the adhesive to adhesively bond the fabric layer to the foam pad.

The advantages of the subject invention include a non-complex, cost-efficient apparatus and method of bonding a seat cover fabric to a foam cushion pad, which method includes rapidly heating and melting the adhesive using transverse electromagnetic radiation waves to bond the fabric layer to the foam pad without damaging the cushion assembly.

The apparatus and method are useful with various types of seat cover fabrics including woven fabrics and leather.

BRIEF DESCRIPTION OF THE DRAWINGS

Other advantages of the present invention will be readily appreciated as the same becomes better understood by reference to the following detailed description when considered in connection with the accompanying drawings wherein:

FIG. 6 is a schematic perspective view of a third embodiment of the subject invention showing the lower mold disposed on a turntable for transferring the cushion assembly into and out of the microwave chamber.

DETAILED DESCRIPTION OF THE DRAWINGS

The subject invention generally relates to an apparatus and method for bonding a seat cover fabric to a foam seat cushion using a heat activated adhesive in the fabrication of cushion assemblies utilized for seat and backrests in automotive applications.

Figure 2:
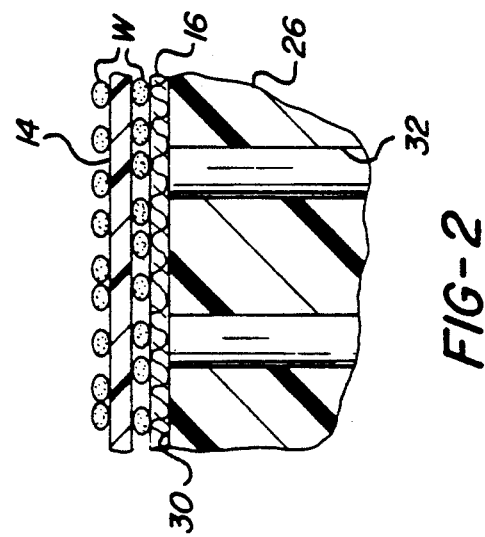
FIG. 2 is a schematic fragmentary cross-sectional view schematically showing the moisture applied to the adhesive of FIG. 1.
Figure 3:
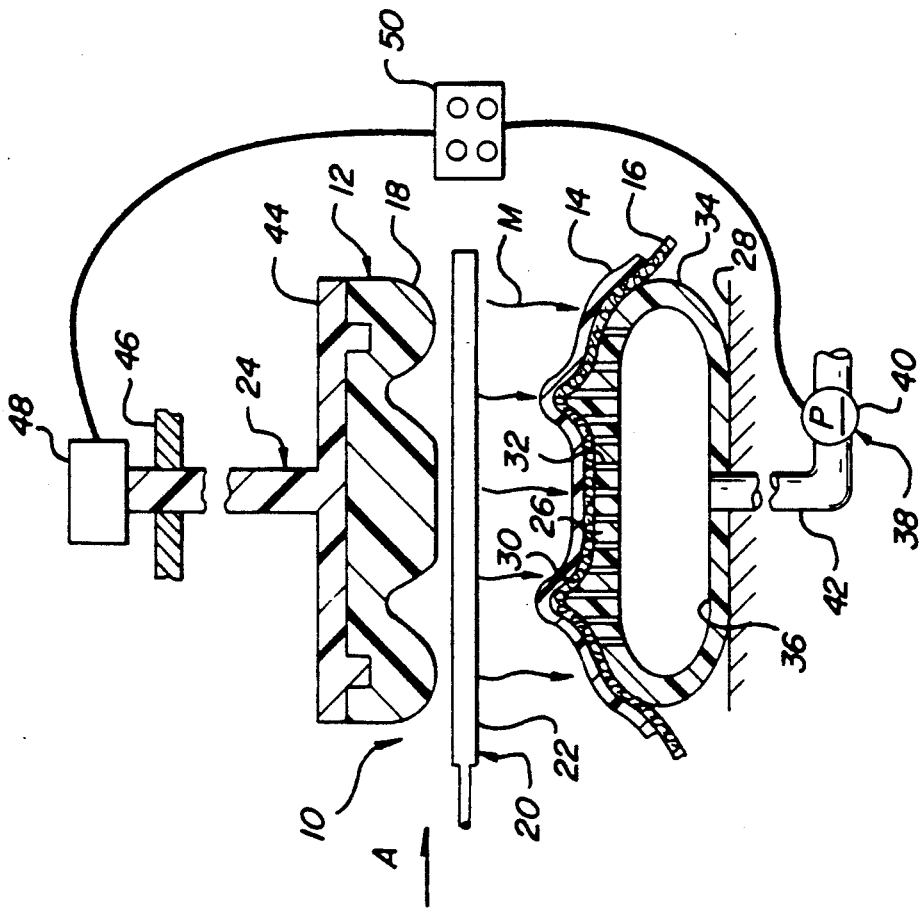
FIG. 3 is a view like FIG. 1 schematically showing a microwave radiation source radiating the adhesive with microwave radiation.

An apparatus constructed in accordance with the present invention which illustrates the basic concept of the subject invention is schematically illustrated in FIGS. 1–4. The apparatus 10 includes a cushion assembly 12 comprising heat-sensitive adhesive means or adhesive 14 disposed between a fabric layer 16 and a cellular foam pad 18. As illustrated in FIG. 3, the apparatus 10 includes electromagnetic radiation heating means, such a microwave radiation source 22, for transmitting transverse electromagnetic radiation waves, such as microwaves M from the microwave radiation source 22, for heating the adhesive 14 to adhesively bond the fabric layer 16 to the foam pad 18. The microwave radiation source 22 may include any of a number of microwave transmitters well known to the industrial microwave art, but has been schematically shown in FIG. 3 to be a type of which is moveable horizontally into and out of a position over the adhesive 14 in the directions of arrows A and B respectively.

A predetermined amount of moisture in the form of water W is supplied with the adhesive 14 for reacting with the microwave radiation M to produce the heat necessary to activate and melt the heat-sensitive adhesive 14. The water W may be included as a manufactured component of the adhesive 14, or may be supplied to the adhesive 14 during fabrication of a seat cushion assembly 12, such as by spraying. FIG. 2 schematically illustrates the water W sprayed onto the adhesive 14 of FIG. 1.

The microwave radiation source 22 heats by emitting microwaves M which penetrate an object and cause molecular vibration therein. Microwaves M are comprised of alternating electromagnetic fields (not shown) which penetrate an object and cause polar molecules within the object (especially water molecules) to align themselves with the electromagnetic field. As the polarity of the field is alternated, the polar water molecules twist repeatedly in order to remain aligned with the field. This repeated twisting of the water molecules generates frictional heat evenly throughout the material. Thus, the water W of the adhesive 14 reacts with the electromagnetic field of the microwaves M to generate frictional heat in an amount necessary to melt the adhesive 14.

The variables of heating such as the frequency and wavelength of the microwaves, the amount of water W, and the microwave exposure time are adjusted to meet the specific requirements of each application. For example, a sufficient amount of water W should be supplied for a given microwave frequency, wavelength and exposure time so that complete melting of the adhesive 14 is achieved and uneven, nonuniform bonding is avoided.

Figure 4:
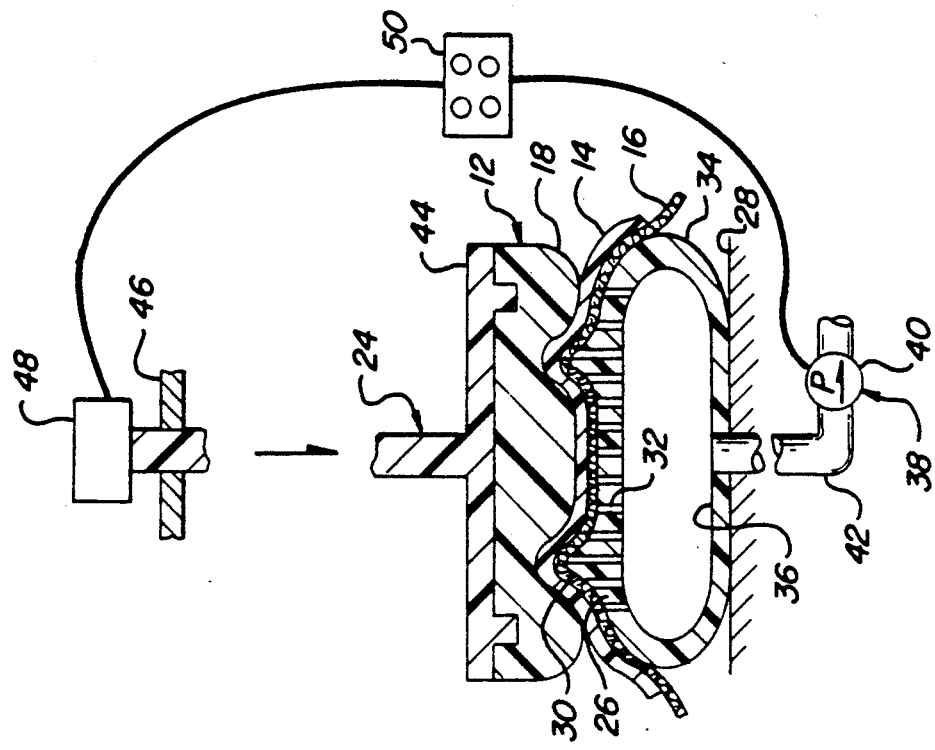
FIG. 4 is a view like FIG. 1 but with the foam pad compressed against the adhesive, fabric and lower mold.

The apparatus 10 further includes press means 24 for compressing the foam pad 18 against the adhesive 14 and the fabric layer 16 into a compressed condition, as best illustrated in FIG. 4. The press means 24 comprises a lower mold 26 supported on a support structure 28. The lower mold 26 has a contoured mold surface 30 supporting the fabric layer 16. The mold 26 includes passages 32 therein in fluid communication of the contoured mold surface 30. A vacuum housing 34 is disposed below the mold surface 30 for providing an air tight chamber 36 in fluid communication with the passages 32. The mold 26 may be made of various known materials which are unreactive or transparent to microwaves M such as fiberglass, polycarbonates, epoxies and the like. These materials offer the necessary support and are relatively unaffected by exposure to microwave radiation.

A vacuum source 38 is in fluid communication with the air tight chamber 36 and passages 32 in the mold 26 for applying a vacuum pressure over the contoured mold surface 30 to urge the fabric layer 16 into conforming engagement with the contoured mold surface 30. The vacuum source 38 may include a vacuum pump, schematically illustrated at 40, connected by vacuum lines 42 to the vacuum housing 34.

The press means 24 further includes an upper pressing fixture 44 suspended from a support structure 46 for vertical movement relative to the cushion assembly 12 for compressing the foam pad 18 against the adhesive 14, fabric layer 16 and the lower mold 26. The pressing fixture 44 includes a suitable power source 48, such as a motor, for controlling the vertical movement of a pressing fixture 44.

A control means, such as an operator controlled control panel 50 is also provided for controlling the vacuum pump 40 and the power source 48.

The adhesive 14 is preferably an air impervious adhesive film or sheet 14. A preferred material which may be utilized as the adhesive film 14 is clear so the operator can see the fabric layer 16 to remove wrinkles by pulling out the periphery. Two films 14 which have proven satisfactory when sprayed with a small amount of water W are a film sold under the trademark WW-22 and an experimental polyamide TJCLS02 (4220 modified), both available from Westwood Products Inc. of 13570 Tontian Road, Apple Valley, Calif. 92307.

The foam pad 18 is preferably the precontoured type fabricated from any of a number of well known materials now utilized as cushion materials, such as the polyester or the polyurethane type. The fabric layer 16 may be any one of many fabrics currently utilized as decorative covers for upholstered seats in automotive vehicles, including woven fabrics, leather, or the like.

In accordance with the subject invention, there is provided a method for making a fabric covered seat cushion assembly 12 of the type utilized for seat and back supports in seat assemblies for automotive vehicles.

In accordance with the subject invention, the fabric layer 16 is placed over the contoured mold surface 30 of the lower mold 26. Thereafter, an adhesive 14 having the proper moisture content is placed over the fabric layer 16. The moisture is supplied to the adhesive 14 in the form of water W either as a component of the adhesive 14 or by being directly applied to the adhesive 14 such as by spraying. This is schematically illustrated in FIG. 2. The adhesive 14 is preferably an air impervious adhesive film or sheet 14.

Figure 1:
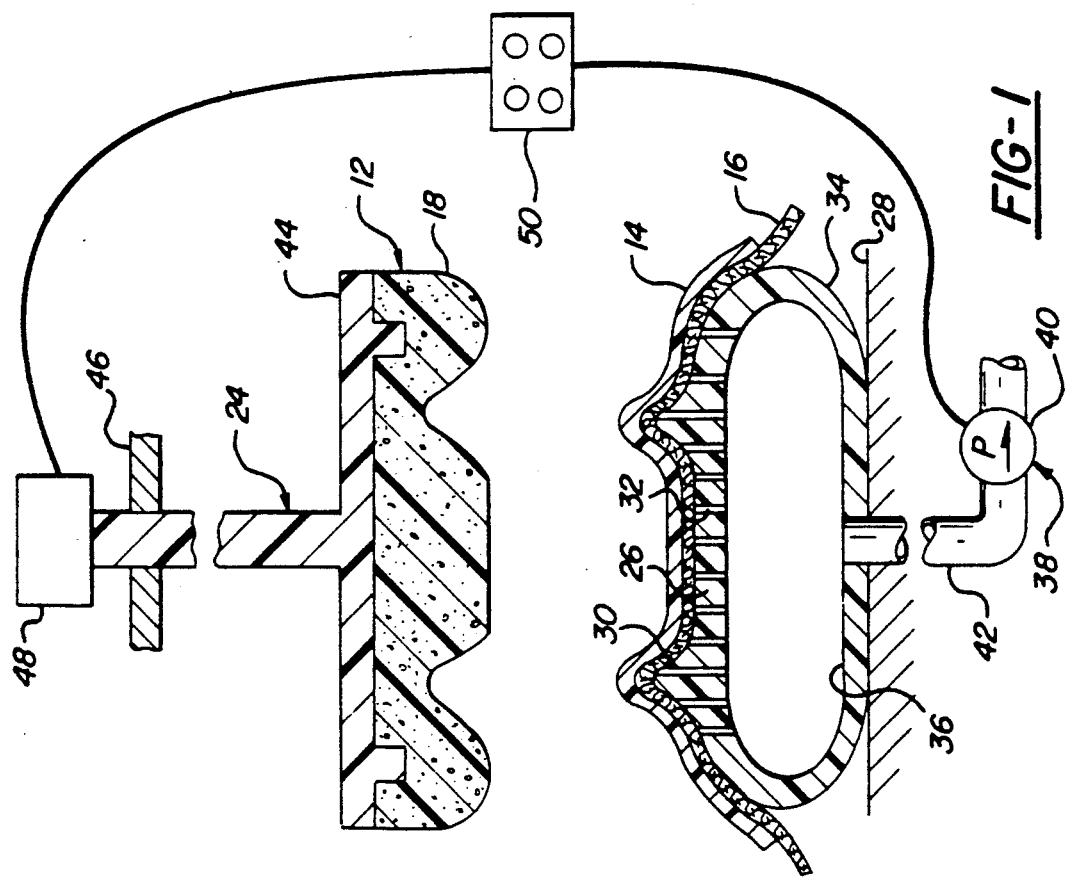
FIG. 1 is a schematic fragmentary cross-sectional view of an assembly constructed in accordance with the subject invention.

A vacuum pressure is applied from the vacuum source 38 through the vacuum line 42, the vacuum housing 34 and through the passages 32 in the lower mold 26 to the contoured mold surface 30 thereof to urge the fabric layer 16 into conforming engagement with the mold surface 30. This is schematically illustrated in FIG. 1.

The electromagnetic radiation heating means 20, such as a microwave radiation source 22, is positioned over the adhesive 14 and energized to radiate the adhesive 14 with transverse electromagnetic radiation waves in the form of microwave radiation waves M for heating the adhesive 14 above its melting temperature. More specifically, the microwave radiation source 22 emits microwaves M at a predetermined frequency and wavelength and for a predetermined about of time for reacting with the water W to produce the heat necessary to melt the adhesive 14. The lower mold 26 is provided as a mold fabricated from fiberglass, polycarbonates, epoxies or the like which are unreactive and relatively unaffected by exposure to microwave radiation.

The microwave radiation is thereafter discontinued and the microwave radiation source 22 removed from the position over the adhesive 14.

The pressing fixture 44 is moved downwardly, compressing the foam pad 18 against the adhesive 14, the fabric layer 16 and ultimately the lower mold 26 into a compressed condition as schematically illustrated in FIG. 4.

The adhesive 14 is allowed to cure, thereby bonding the fabric layer 16 to the foam pad 18. Once the adhesive 14 is cured, the pressing fixture 44 is raised and the completed cushion assembly 12 is removed from the mold 26.

Figure 5:
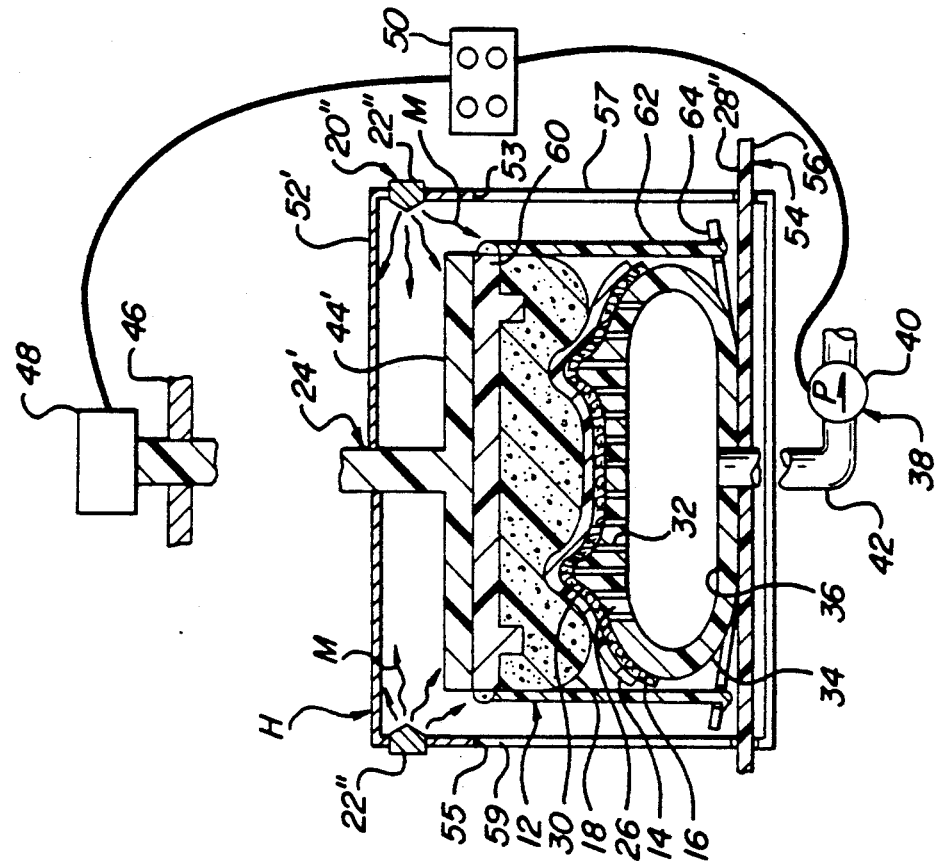
FIG. 5 is a schematic fragmentary cross-sectional view of a second embodiment of the subject invention similar to the first embodiment but with the cushion assembly disposed in a microwave chamber.

A second embodiment of the subject invention is schematically illustrated in FIG. 5. Equivalent structural features are represented as primed numbers throughout the embodiments. The second embodiment of FIG. 5 is similar to the embodiment of FIGS. 1-4 except that the microwave radiation source 22' comprises an industrial microwave chamber or oven 52 disposed about the cushion assembly 12, the lower mold 26 and upper pressing fixture 44. The microwave oven 52 may include any of a number of types of microwave ovens well known to the industrial microwave heating industry. With a microwave oven 52, the microwaves M are emitted and contained within the microwave chamber 52. Since the upper pressing fixture 44 is disposed within the microwave chamber 52, the upper pressing fixture 44, like the lower mold 26, is preferably fabricated from a material which is unreactive or transparent to microwave radiation. Thus, the materials used to construct the lower mold 26 may also be suitable for the upper pressing fixture 44.

The method of the second embodiment is similar to that of the first embodiment except that the foam pad 18 may be compressed against the adhesive 14, fabric layer 16 and lower mold 26 into the compressed condition prior to radiating the cushion assembly 12 with the microwave radiation. In other words, after the vacuum is supplied over the mold surface 30 of the lower mold 26 to draw the fabric layer 16 against the mold surface 30, the upper pressing fixture 44 may be moved vertically toward the lower mold 26 to compress the cushion assembly 12 into the compressed condition prior to activating the microwave radiation source 22'.

Figure 7:
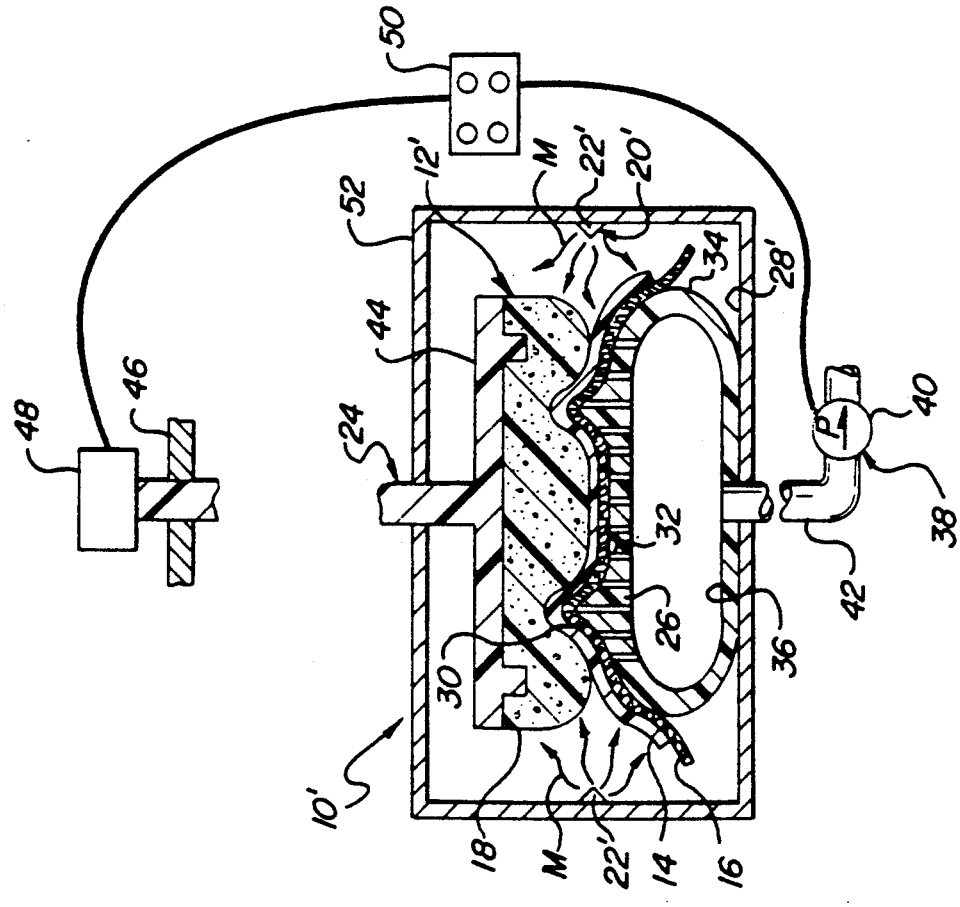
FIG. 7 is a schematic fragmentary cross-sectional view taken substantially along lines 7—7 of FIG. 6 showing a locking plate disposed between the upper pressing fixture and the cushion assembly.

FIGS. 6 and 7 schematically illustrate a third embodiment 10" of the subject invention. The third embodiment 10" is similar in concept to the first two embodiments except that the third embodiment 10" includes transfer means 54 for transferring the cushion assembly 12 into and out of a microwave chamber 52'. The microwave chamber 52, includes openings 53, 55 covered by doors 57, 59 for admitting and discharging the cushion assembly 12 from the microwave chamber 52'. The transfer means 54 includes a rotatable platform or turntable 56 extending through the openings 53, 55 in the microwave chamber 52. Since the turntable 56 passes through the microwave chamber, the turntable 56 should be one which is relatively unaffected by microwave radiation. Thus, materials such as fiberglass, polycarbonates, epoxies and the like would be suitable for the turntable 56. The turntable 56 is powered by a motor 58 and controlled by the control panel 50 for rotation of the turntable 56 in the direction of arrow R. A lower mold 26 is supported on the upper surface 28" of the turntable 56 and moves with the turntable 56 between a loading station L, a heating and pressing station H, a cooling station C, and an unloading station U. There are preferably four such lower molds 26 positioned along the turntable 56 so that each of the four lower molds 26 are at a different station L, H, C, U at any one given time.

The upper pressing fixture 44' may include a locking plate 60 disposed between the foam pad 18 and the upper pressing fixture 44'. The locking plate 60 includes means for locking the cushion assembly 12 in the compressed condition. As schematically shown in FIG. 7, the locking plate 60 may include hooks 62 pivotally secured thereto for engagement with brackets 64 secured to the lower mold 26. Upon compression of the cushion assembly 12 by the upper pressing fixture 44', the hooks 62 engage the brackets 64 thereby locking the cushion assembly 12 in the compressed condition. The cushion assembly 12 thus remains locked in the compressed condition after the pressing fixture 44' is removed. The locking plate 60, like the lower mold 26 and upper pressing fixture 44', is constructed of material which is nonreactive or transparent to microwave radiation. Thus, materials such as fiberglass, polycarbonates, epoxies and the like would be suitable materials for the locking plate 60.

The method of operation using the third embodiment 10" is also a similar in concept to the first two embodiments 10, 10'. With the third embodiment 10", the fabric layer 16 is placed over the contoured mold surface 30 of a lower mold 26 positioned at the loading station L. The fabric layer 16 is thereafter overlaid with an adhesive 14 having a proper amount of water W included therewith and a vacuum pressure applied over the mold surface 30 to draw the fabric layer 16 into conforming engagement with the mold surface 30. The foam pad 18 is then positioned in facing engagement with the adhesive 14. The turntable 56 is rotated in the direction of arrow R to transfer the mold 26 and cushion assembly 12 from the loading station L to the heating station H. At the heating station H, the mold 26 and cushion assembly 12 are within the microwave chamber 52.

Thereafter, the upper pressing fixture 44' and locking plate 60 are moved vertically into engagement with the foam pad 18, compressing the foam pad 18 against the adhesive 14, fabric layer 16 and lower mold 26 into the compressed condition. As the cushion assembly 12 is compressed to the compressed condition, the hooks 62 on locking plate 60 engage the bracket 64 to lock the cushion assembly 12 in the compressed condition.

The microwave radiation source 22" is then energized for emitting microwave radiation waves M into the microwave chamber 52'. As with the first two embodiments 10, 10', the microwaves M react with the moisture or water W of the adhesive 14 to heat and melt the adhesive 14.

The upper pressing fixture 44' is moved vertically out of pressing engagement with the locking plate 60, and the turntable 56 is again rotated in the direction of arrow R to move the mold 26, cushion assembly 12 and locking plate 60 from the heating station H to the cooling station C, illustrated by phantom lines in FIG. 6. The cushion assembly 12 is allowed to remain at the cooling station C an amount of time sufficient to cure the adhesive 14, thereby bonding the fabric layer 16 to the foam pad 18. Once the adhesive 14 is cured, the turntable 56 is again rotated in the direction of arrow R, moving the lower mold 26 cushion assembly 12 and locking plate 60 from the cooling station C to the unloading station U, illustrated by phantom lines in FIG. 6. At the unloading station U, the locking plate 60 is removed and the completed cushion assembly 12 removed from the lower mold 26.

As described hereinabove, the turntable 56 has four lower molds 26 positioned so that each of the four molds 26 is at a different station L, H, C, U. This allows for a continuous, efficient manufacturing process. For illustrative purposes, however, only one mold 26 is shown as in FIG. 6.

With each of the above methods, the vacuum may be discontinued as soon as the fabric layer 16 is drawn against the mold surface 30, or may be continued throughout the pressing, heating and cooling operations.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A method comprising the steps of:
   positioning a steam activated adhesive sheet (14) between a fabric layer (16) and a precontoured foam pad (18) adapted for use as a seat or backrest cushion in a seat cushion assembly (12);
   contacting the fabric layer (16), adhesive sheet (14) and foam pad (18) together;
   supplying liquid water (W) to a surface of the adhesive sheet (14) before said contacting step and thereafter radiating the fabric layer (16), adhesive sheet (14), said water (W) and foam pad (18) with microwave radiation (M) thereby generating steam in amounts sufficient to activate the adhesive (14), and adhesively bonding the fabric layer (16) to the foam pad without damaging either the fabric layer (16) or the foam pad (18).

2. A method as set forth in claim 1 further characterized by compressing the foam pad (18) against the adhesive sheet (14) and fabric layer (16).

3. A method as set forth in claim 2 further characterized by providing a lower mold (26) having a porous contoured mold surface (30).

4. A method as set forth in claim 3 further characterized by positioning the fabric layer (16) and the adhesive sheet (14) over the contoured mold surface (30) and supplying a vacuum over the contoured mold surface (30) to urge the fabric layer (16) into conforming engagement therewith prior to radiating the adhesive sheet (14) with the microwave radiation waves (M).

5. A method as set forth in claim 4 wherein said adhesive sheet (14) is air impervious.

6. A method as set forth in claim 5 wherein said lower mold (26) is unreactive to the microwave radiation waves (M).

7. A method as set forth in claim 4 further characterized by providing a pressing fixture (44/or 44') which is unreactive to the microwave radiation waves for compressing the foam pad (18) against the adhesive sheet (14) and the fabric layer (16).

8. A method as set forth in claim 7, wherein the foam pad (18), adhesive sheet (14) and fabric layer (16) together comprise said seat cushion assembly (12), further characterized by transferring the cushion assembly (12) into a microwave chamber (52) prior to radiating the cushion assembly (12) with microwave radiation waves (M).

* * * * *